United States Patent [19]

Barlow

[11] 4,345,858

[45] Aug. 24, 1982

[54] PARTICULATE MATERIAL DISPENSING AND WEIGHING SYSTEM AND METHOD

[75] Inventor: Robert C. Barlow, Bridgeville, Del.

[73] Assignee: O. A. Newton & Son Company, Bridgeville, Del.

[21] Appl. No.: 180,923

[22] Filed: Aug. 25, 1980

[51] Int. Cl.³ .............................................. B65G 53/66
[52] U.S. Cl. ........................................ 406/34; 222/77; 406/23; 406/33; 406/120
[58] Field of Search .................................. 406/23–25, 406/31–33, 34, 117–120; 222/56, 77

[56] References Cited

U.S. PATENT DOCUMENTS

| | | | |
|---|---|---|---|
| 600,031 | 3/1898 | Richards . | |
| 2,285,765 | 6/1942 | Carswell . | |
| 2,587,531 | 2/1952 | Saxe . | |
| 2,687,285 | 8/1954 | Fisher . | |
| 2,712,203 | 7/1955 | Green . | |
| 2,858,594 | 11/1958 | Eirich et al. | |
| 2,893,601 | 7/1959 | Barber et al. | |
| 3,077,365 | 2/1963 | Fisher | 406/23 |
| 3,251,484 | 5/1966 | Hagan . | |
| 3,253,744 | 5/1966 | MacPherson et al. | 222/56 |
| 3,311,418 | 3/1967 | Scruby et al. | 406/34 |
| 3,797,890 | 3/1974 | Walters . | |
| 3,989,308 | 11/1976 | Zimmermann et al. | 406/23 |

FOREIGN PATENT DOCUMENTS 2347661  11/1977  France .

Primary Examiner—Bruce H. Stoner, Jr.
Assistant Examiner—Edward M. Wacyra
Attorney, Agent, or Firm—Irvin A. Lavine

[57] ABSTRACT

A dispensing and weighing system for multiple ingredients, including a plurality of individual ingredient batch weighers. Each batch weigher includes apparatus to store and dispense a particulate material to a scale from which the weighed portion of the material is intended to be delivered to a pneumatic ingredients delivery conduit. The pneumatic conduit discharges into a weighing hopper, where the weight of all of the batches delivered to the hopper is determined. A method for dispensing individual, weighed batches of particulate material, and for determining the total weight of the material actually delivered to a receiver.

9 Claims, 1 Drawing Figure

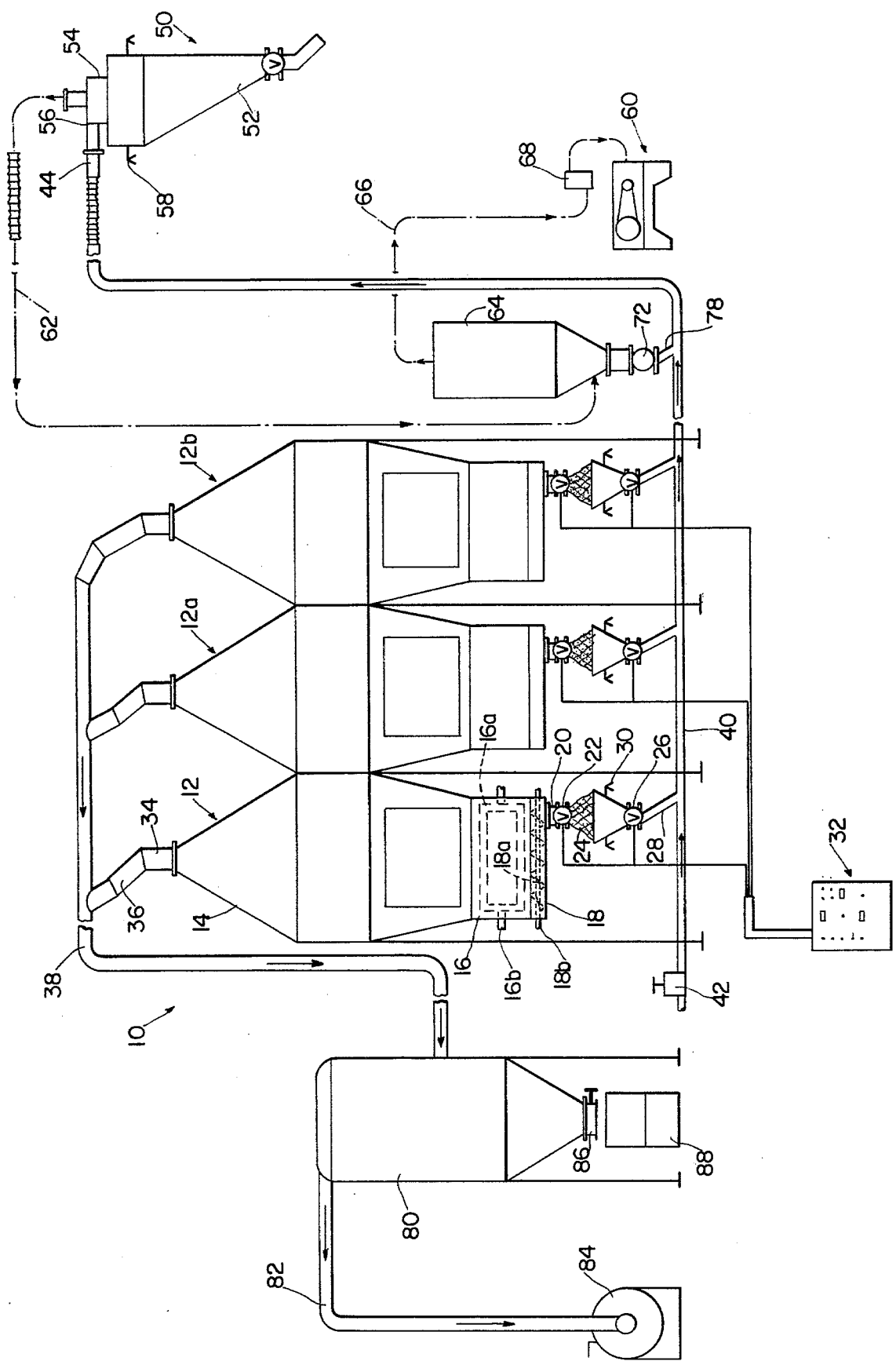

PARTICULATE MATERIAL DISPENSING AND WEIGHING SYSTEM AND METHOD

BACKGROUND OF THE INVENTION

The invention relates to an apparatus and method for dispensing and weighing individual particulate material ingredients to be formed into a composite batch.

In the plastics industry, as well as in other industries, there is a need for mixing materials, including a large weight of base material and one or more relatively small weights of additive material. For example, it may be desired to provide four hundred pounds of base material and one or more additives, each having a weight of from two to eighty pounds. These materials are of a particulate nature, and may be in one or more degrees of fineness. Thus, these materials may be powders, grains, particles and even small chips. It has been found that the most facile way of storing and dispensing the weighed amounts of these additive materials is through utilization of batch weighers, and a pneumatic delivery conduit. Each batch weigher includes a storage hopper, a scale, some apparatus to deliver material from the storage hopper to the scale, and a branch conduit for delivering the weighed batch of material from the scale to the pneumatic delivery conduit.

In the plastics industry, in particular, it is highly critical that the final mass of material contains all of the ingredients prescribed, and, further, contains each of the ingredients in the prescribed amount. This is because the ingredients, themselves, are expensive, and the further processing of the ingredients into the desired plastic material or articles is also expensive, so that the processing of a mass which contains improper amounts of material is undesirably wasteful. As often happens, a mass of material, intended to be formed of a plurality of precisely weighed ingredients, is not actually composed of the ingredients in the amounts intended. This fact is not known, when the mass is to be subjected to further processing so that the mass of material is then processed, with the result that the final product must be either discarded, sold at a significant discount, or reprocessed, where possible, and in any event, these are expensive and wasteful additional steps which are undesirable.

In the practice which has existed with the equipment of the above described nature, where a mass of material has been mixed, and it is found that it contains an improper formulation of ingredients, that mass is, at some point in its processing, discarded, reprocessed or discounted, and a new mass is then produced, hopefully having the correct formulation.

Although the batch weighers and the pneumatic conveying systems which have been used are usually reliable, and usually there is delivery of the entire amount of the ingredient from each of the batch weighers to a collector, it is known that a deficiency arises in some instances, due to the failure of the material to be delivered by the pneumatic conveyor to the collector; some of the material, when a mal-function occurs, remains in a part of the system, such as in a separator for separating air from particulate material, which separator is in the system prior to the collector. In the past, there have been attempts to provide a solution to the problem of mal-function of the apparatus, particularly of the pneumatic conveyor and/or air-material separator, and this solution has been the provision of a material indicator placed in the base of the abovementioned separator, just above the air lock controlling the discharge of material from the separator, so as to detect any material remaining in the separator after it has been, in theory, exhausted of material. This solution has not been found to be satisfactory, because it is now recognized that the material indicator only gives an indication after several batches have passed through with resulting malfunctioning of each batch. That is, some of the material in each batch has failed to be discharged from the separator, and some of the material, of unknown constituency, has therefore remained in the separator. Thus, only after several, perhaps a dozen, batches have failed to be completely discharged from the separator into the collector is the operator made aware of the mal-function by the action of the material indicator.

In the distinct field of concrete mixing, Eirich et al U.S. Pat. No. 2,858,594 discloses a plant in which hoppers are provided for storing the various ingredients, the ingredients being delivered to mixers, and then to a final delivery hopper. In particular, a cement hopper is provided which deliver to a scale and sand and gravel containers are provided with screw conveyers which weigh out the components; however, this "weighing out" is imprecise, based on volumetric measurement. These screw conveyers deliver to a scale, and from the two scales, the sand, gravel and cement are delivered to a mixer, to which metered water is added. The ingredients are mixed, and then delivered to a feeder, the feeder including a scale, and the mixed components, i.e. concrete, are delivered by the feeder. Thus, the functions performed by the elements of this structure are of merely volumetric measurements, which are roughly, or grossly related to weight, but are, as noted, imprecise.

SUMMARY OF THE INVENTION

The present invention is directed to a particulate material dispensing and weighing system and method, in which determination may be made of the actual total weight of material delivered by the dispensing system. The dispensing system includes a plurality of individual dispensers for weighed amounts of materials, known as batch weighers. There are provided a plurality of batch weighers, and each includes a storage hopper, an agitator, a feed auger and a valved conduit to deliver material from the feed auger to a weigher, the weigher including a receiver or container, and a scale. From the weigher, a valved branch delivery conduit is connected to a pneumatic ingredients delivery conduit, so that there are a plurality of batch weighers which are capable of delivering a weighed amount of material to the pneumatic ingredients delivery conduit. This conduit is intended to deliver all of the material which it receives from the batch weighers to a receiver, in the form of a hopper having a separator and a weigher, so that there is collected all of the material actually delivered by the pneumatic ingredients delivery conduit, and the weighing of the total of that material, so that there may be verified the receiving or collection of all of the material intended to be delivered by the batch weighers. As a consequence, determination may be made regarding the actual delivery of precise weights of particulate material ingredients from the batch weighers to the collector or receiver hopper.

Among the objects of the present invention are the provision of a particulate material dispensing and weighing system and method in which verification can be obtained that the intended amounts of ingredients have been actually delivered to a collection or receiving receptacle.

Other objects and many of the attendant advantages of the present invention will be readily understood from the following description, drawing and claims.

BRIEF DESCRIPTION OF THE DRAWING

The single FIGURE of the drawing illustrates, in partially diagramatic form, a particulate material dispensing and weighing system in accordance with the present invention, which enables the practice of the herein disclosed method.

DESCRIPTION OF THE PREFERRED EMBODIMENT

Referring now to the drawing, there is shown therein a system or apparatus generally designated 10, for dispensing pre-selected quantities of particulate materials, the apparatus 10 including a plurality of batch weighers 12, 12a and 12b, each of which is substantially identical to the other. Referring to batch weigher 12, for example, it will be seen to include a storage hopper 14, preferably made of sheet metal, and being substantially impervious. Material may be delivered into the hopper 14 through suitable openings or doors, not shown. At its lower end, the hopper 14 is in open communication with an agitator 16. The agitator 16 includes an outer housing forming a generally cylindrical chamber, which has rotating in it a paddle-wheel agitator 16a, a shaft 16b of which extends outwardly, and which is connected to a suitable source of energy, not shown. Below the agitator 16 is an auger feeder 18, having a screw auger 18a within a substantially cylindrical housing, and having a drive shaft 18b extending from an end thereof, and also connected to a source of power, not shown. A slot extending between the bottom of the housing of the agitator 16 and the top of the housing of the auger feeder 18 enables particulate material to be moved from the agitator 16 to the auger feeder 18, and the housing of the auger feeder 18 has at the delivery end a conduit 20 having a valve 22 therein. Below valve 22 there is a receiver 24 for receiving a portion or a batch of the particulate material from the hopper 14 through the valve 22 when it is opened. The receiver 24 has at its bottom a valve 26, which latter is connected by a branch conduit 28 to a pneumatic ingredients delivery conduit 14. A scale 30 is provided for weighing the material delivered to the receiver 24.

In operation, the agitator 16 and auger feeder 18 are actuated, with the valve 22 open and the valve 26 closed, so that there is delivered to the receiver 24 a quantity of material, and this quantity is weighed by the scale 30 to determine that the correct amount has been delivered. Preferably, the valves of the batch weighers 12, 12a and 12b, such as the valves 22 and 26, are controlled by an electrical system generally designated 32, so that an operator may, by opening and closing switches in a known manner, control solenoids which operate the various valves. A suitable apparatus, not shown, may be utilized to discharge material from the receiver 24 into the branch conduit 28 and thence into the pneumatic ingredients delivery conduit 40.

Although three of the batch weighers 12, 12a and 12b are shown in the drawings, it will be understood that this number is illustrative only, and it will be understood that there may be only two such batch weighers, or there may be as many as are needed to meet the requirements of the installation in which the system or apparatus 10 is placed. For example, in the chemical industry, a larger number of batch weighers may be required, depending upon the material to be produced. It will be understood that the sizes of the batch weighers may vary, in accordance with the requirements of the particular installation.

The pneumatic ingredients delivery conduit 40 has a pressure relief valve 42 at its inlet end, and at its delivery end 44 it is connected to an apparatus, generally designated 50, for verifying the weight of material actually delivered by the pneumatic ingredients delivery conduit 40. The apparatus 50 includes a receiver or hopper 52 having at its upper end air separator 54, of known type, separator 54 having an inlet 56 to which the delivery end of the pneumatic ingredients delivery conduit 44 is attached. A vacuum pump 60 draws air through the pneumatic ingredients delivery conduit 40 by way of conduit 62 which is connected to the separator 54, the conduit 52 extending to a filter 64 which serves to separate "fines" carried through the conduit 62 from the air therein, the fines collecting in the filter 64, and there being a conduit 66 extending from filter 64, to the suction pump 60, through a further filter 68. An airlock 72 at the base of filter 64 may be opened, so as to permit the discharge of material separated by the filter 64 through a branch conduit 78 to the pneumatic ingredients delivery conduit 40. As is clearly shown in the drawing, the branch conduit 78 is between the delivery end 44 of conduit 40 and the weigh scale of the weigh hopper 12b which is closest to the delivery end 44.

The batch weigher 12, like the other batch weighers, has at its upper end an outlet 34 which is connected by a branch conduit 36 to a dust collection conduit 38 which extends to a dust collection filter 80, a vacuum line 82 extending from the filter 80 a motor-driven fan 84. A valve 86 at the lower end of the filter 80 is provided for the removal of dust, on a periodic basis, so that the dust may be deposited into the receptacle 88.

In operation, a formulation is utilized which requires a specific number of pounds of ingredients in dry powder, granular or chip form, generally designated as particulate, from each of the batch weighers 12, 12a, 12b. This is accomplished in the manner above noted, in which the agitator 16 and auger feeder 18 are actuated, and the required weight of each ingredient is caused to flow into the receiver 24, weighed therein, and then discharged through the branch line 28. As a result, it is intended that there be delivered to the collector or receiver 50 a total weight of particulate material, made up of specific weights of each of the ingredients. If the apparatus in system 10 functions as intended, the total weight delivered to the collector or receiver 52, as determined by the scale 58, will be the same or substantially the same as the sum of the individual weights measured by the various scales 30 of the batch weighers 12, 12a and 12b. In some instances, however, it has been observed that the total weight was not that which was ostensibly delivered through the branch conduits 28, and it has been found that the discrepancy has been due to the particulate material bridging in the pneumatic ingredients delivery conduit 40, or otherwise remaining therein, or at least a part of an ingredient batch remaining therein, and therefore the scale 58 serves to verify whether the batches intended to be delivered have actually been delivered to the receiver of collector 52. Scale 58 also provides a verification of the complete emptying of the collector 52, when emptying has been ostensibly effected. It will be understood that other malfunctions than those noted might be the cause of a failure of delivery to the receiver or collector 52, such as an error on the part of the operator in operating the controls of the various valves, such as valves 22 and 26, or a failure of the receiver 24 or valve 26 to function as intended.

The verification of the total weight actually delivered to the receiver or collector 52 is of extreme importance, as is the weight actually delivered therefrom, since in most, if not all, mixing apparatus, it is highly critical that the final mass of material contain the proper amounts of the individual ingredients and components, in accordance with the intended formulation, and any variation is extremely important, because there would result an improper ration of the ingredients in the final mass.

Fines separated in the separator 56 are carried with the air through the conduit 62, and are almost entirely separated in the filter 64, being retained therein, and being capable of being recovered by being discharged as desired through the branch conduit 78.

In addition, dust existing in the hoppers 14 of the batch weighers 12, 12a and 12b is collected by the dust collection conduit 38, and separated by the filter 80, where, upon demand, the dust may be collected in the receptacle 88.

There has been provided a dispensing and weighing system and method by which verification may be made of the ingredients and weights of ingredients making up the final mass which is to be further processed, the herein described method and apparatus thereby providing for accuracy and affording economy in that wasteage of productive capacity and energy are obviated through the disclosed method and apparatus.

It will be obvious to those skilled in the art that various changes may be made without departing from the spirit of the invention, and therefore the invention is not limited to what is shown in the drawings and described in the specification but only as indicated in the appended claims.

I claim:

1. Apparatus for dispensing pre-selected quantities of multiple particulate material ingredients comprising:
   (a) plural storage hopper means, one for each of a plurality of ingredients,
   (b) plural ingredient weigh scales, one for each of said ingredients,
   (c) means for discharging the ingredient from each storage hopper means to a respective weigh scale,
   (d) a pneumatic ingredients delivery conduit,
   (e) means for delivering ingredient from each said weigh scale to said delivery conduit, and
   (f) means for receiving and for weighing the total quantity of material delivered by said delivery conduit,
   (g) whereby the total quantity of material delivered is compared with the sum of the weights indicated by said ingredient weigh scales.

2. The apparatus of claim 1, said last mentioned means comprising receiving hopper means comprising an inlet, said delivery conduit having a delivery end connected to said inlet.

3. The dispensing apparatus of claim 2, said receiving hopper means comprising air and material separator means, a suction line connected thereto, and air pump means connected to said suction line for drawing air therethrough.

4. The dispensing apparatus of claim 3, and a fines separator in said suction line between said receiving hopper and said air pump means.

5. The dispensing apparatus of claim 4, and means including airlock means for delivering material from said fines separator to said delivery conduit between said delivery end and the weigh scale closest to the delivery end.

6. The dispensing apparatus of claim 1, said storage hopper means each being substantially closed and having an outlet therefrom at the upper portion thereof, a dust collection conduit connected to each said outlet, and fan means for drawing air and dust through said dust collection conduit.

7. The dispensing apparatus of claim 6, and filter means connected to the discharge end of the dust collection conduit, and conduit means for connecting said filter means to said fan means.

8. A particulate materials dispensing and weighing system comprising:
   a plurality of batch weighers, each batch weigher comprising a hopper for material, a scale, means for delivering material from the hopper to the scale, and means for discharging material from the scale,
   a pneumatic ingredients delivery conduit,
   conduit means connecting each said discharge means with said delivery conduit,
   a receiving hopper having an inlet and a valved outlet,
   said conduit means having a delivery end connected to the inlet of said receiving hopper, and
   means for determining the weight of material delivered to said receiving hopper,
   whereby the weight of the materials delivered to the receiving hopper is compared with the sum of the weights of the materials delivered from the batch weighers.

9. A method of dispensing and combining pre-selected weights of particulate material ingredients comprising:
   individually storing a plurality of ingredients,
   weighing a pre-selected portion of at least a plurality of said ingredient,
   providing a pneumatic delivery conduit for delivering particulate material,
   providing a branch delivery conduit for transferring individual weighed material portions to the pneumatic delivery conduit,
   and collecting the material delivered by the delivery conduit and weighing the collected material to provide a comparison of the total weight of the material delivered and collected to the sum of the weight of the weighed pre-selected portions.

* * * * *